US011388055B2

(12) United States Patent
Sigoure

(10) Patent No.: US 11,388,055 B2
(45) Date of Patent: Jul. 12, 2022

(54) DATA ANALYTICS ON INTERNAL STATE

(71) Applicant: Arista Networks, Inc., Santa Clara, CA (US)

(72) Inventor: Benoit Sigoure, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/396,504

(22) Filed: Aug. 6, 2021

(65) Prior Publication Data

US 2021/0367845 A1 Nov. 25, 2021

Related U.S. Application Data

(62) Division of application No. 16/808,264, filed on Mar. 3, 2020, now Pat. No. 11,115,281, which is a division (Continued)

(51) Int. Cl.
*H04L 41/085* (2022.01)
*H04L 41/0853* (2022.01)

(Continued)

(52) U.S. Cl.
CPC ........ *H04L 41/0856* (2013.01); *H04L 41/046* (2013.01); *H04L 41/085* (2013.01); *H04L 41/0853* (2013.01); *H04L 41/0863* (2013.01); *H04L 41/147* (2013.01); *H04L 67/1097* (2013.01)

(58) Field of Classification Search
CPC . H04L 41/0856; H04L 41/046; H04L 41/085; H04L 41/0853; H04L 41/0863; H04L 41/147; H04L 67/1097
See application file for complete search history.

(56) References Cited

U.S. PATENT DOCUMENTS 5,534,845 A 7/1996 Issa et al.
6,192,418 B1 2/2001 Hale et al.

(Continued)

OTHER PUBLICATIONS

Bialek, Janusz, et al. "Benchmarking and validation of cascading failure analysis tools." IEEE Transactions on Power Systems 31.6 (2016): 4887-4900.*

*Primary Examiner* — Jimmy H Tran
(74) *Attorney, Agent, or Firm* — Fountainhead Law Group P.C.

(57) ABSTRACT

Various embodiments are described herein to track and/or update the state of components within a network element. One embodiment provides for a network management system comprising a collector node including an ingest gateway to receive configuration and status data of a set of network elements coupled to the collector node via the network, the collector node further to store the configuration and status data from the set of network elements in a distributed database; a search engine to locate and retrieve the configuration and status data of a specified subset of the network elements at a specified time period; and an interface server to receive a request for the configuration and status data from an external requester, the interface server to facilitate provision of the configuration and status data in response to the request.

20 Claims, 11 Drawing Sheets

STATE AND STATUS COLLECTION AND ANALYSIS - 500

Related U.S. Application Data of application No. 15/165,358, filed on May 26, 2016, now Pat. No. 10,623,258.

(60) Provisional application No. 62/263,487, filed on Dec. 4, 2015, provisional application No. 62/182,942, filed on Jun. 22, 2015.

(51) Int. Cl.

*H04L 41/046* (2022.01)
*H04L 67/1097* (2022.01)
*H04L 41/0859* (2022.01)
*H04L 41/147* (2022.01)

(56) References Cited

U.S. PATENT DOCUMENTS 6,507,589 B1 1/2003 Ramasubramani et al.
6,674,767 B1 1/2004 Kadyk et al.
6,686,838 B1 2/2004 Rezvani et al.
6,756,998 B1 6/2004 Bilger
6,963,981 B1 11/2005 Bailey et al.
7,043,537 B1 5/2006 Pratt
7,107,322 B1 9/2006 Freeny, Jr.
7,149,814 B2 12/2006 Neufeld et al.
7,164,907 B2 1/2007 Cochran et al.
7,412,447 B2 8/2008 Hilbert et al.
7,529,192 B2 5/2009 Labovitz et al.
7,681,201 B2 3/2010 Dale et al.
7,684,418 B2 3/2010 Scott et al.
7,843,906 B1 11/2010 Chidambaram
7,843,907 B1 11/2010 Abou-Emara
7,928,840 B2 4/2011 Kim et al.
7,970,863 B1 6/2011 Fontaine
8,347,384 B1 1/2013 Preston
8,584,199 B1 11/2013 Chen et al.
8,667,399 B1 3/2014 Brandwine et al.
8,667,495 B1 3/2014 Brandwine et al.
8,954,978 B1 2/2015 Brandwine et al.
8,966,027 B1 2/2015 Brandwine et al.
9,009,349 B2 4/2015 Narayanan
9,495,234 B1 * 11/2016 Hamman .............. G06F 11/079
9,509,772 B1 11/2016 Rose et al.
9,628,339 B1 * 4/2017 Thai ........................ H04L 67/10
9,712,381 B1 * 7/2017 Emanuel ............. H04L 41/0645
9,819,540 B1 * 11/2017 Bahadur ................. H04L 45/50
9,838,272 B2 12/2017 Djukic et al.
9,893,940 B1 * 2/2018 Chawla ............... H04L 41/0816
10,057,156 B2 8/2018 Larson et al.
10,187,286 B2 1/2019 Sigoure
10,212,034 B1 * 2/2019 Carranza Giotto .......................... H04L 41/0863
10,291,497 B2 5/2019 Mehta et al.
10,559,193 B2 2/2020 Naidoo et al.
10,601,661 B2 3/2020 Sigoure
10,623,258 B2 4/2020 Sigoure
2002/0012341 A1 1/2002 Battle
2002/0091991 A1 7/2002 Castro
2002/0101820 A1 8/2002 Gupta et al.
2002/0150086 A1 10/2002 Bailey et al.
2003/0023839 A1 1/2003 Burkhardt et al.
2003/0062997 A1 4/2003 Naidoo et al.
2003/0137991 A1 7/2003 Doshi et al.
2005/0021626 A1 1/2005 Prajapat et al.
2005/0120082 A1 6/2005 Hesselink et al.
2005/0232284 A1 10/2005 Karaoguz et al.
2005/0267605 A1 12/2005 Lee et al.
2005/0267963 A1 12/2005 Baba et al.
2005/0282557 A1 12/2005 Mikko et al.
2006/0190777 A1 8/2006 Chuang
2006/0242395 A1 10/2006 Fausak
2006/0271695 A1 11/2006 Lavian
2006/0282886 A1 12/2006 Gaug
2007/0079385 A1 4/2007 Williams et al.
2007/0208551 A1 9/2007 Herro
2007/0211742 A1 9/2007 Trisno et al.
2007/0216764 A1 9/2007 Kawk
2007/0256105 A1 11/2007 Tabe
2008/0046593 A1 2/2008 Ando et al.
2008/0080536 A1 4/2008 Chhaya et al.
2008/0117922 A1 5/2008 Cockrell et al.
2009/0077622 A1 3/2009 Baum et al.
2009/0307307 A1 12/2009 Igarashi
2010/0118714 A1 * 5/2010 Labovitz ............... H04L 41/142 370/252
2010/0226260 A1 9/2010 Zinjuvadia et al.
2010/0241748 A1 9/2010 Ansari et al.
2011/0122866 A1 * 5/2011 Vasamsetti .......... H04L 43/0817 370/352
2011/0283006 A1 11/2011 Ramamurthy
2011/0305160 A1 12/2011 Green et al.
2012/0320788 A1 12/2012 Venkataramanan et al.
2013/0010610 A1 1/2013 Karthikeyan et al.
2013/0122894 A1 5/2013 Carlin et al.
2013/0194974 A1 * 8/2013 Purkayastha ....... H04L 41/0213 370/255
2013/0332399 A1 12/2013 Reddy et al.
2013/0342342 A1 12/2013 Sabre et al.
2014/0229630 A1 * 8/2014 Narayanan .............. H04L 45/38 709/238
2014/0298335 A1 * 10/2014 Regev ................... G06F 11/261 718/1
2014/0314400 A1 * 10/2014 Lee ......................... H04L 45/28 398/1
2014/0337467 A1 11/2014 Pech et al.
2015/0051893 A1 * 2/2015 Ratcliffe, III ....... H04L 63/1433 703/13
2015/0092561 A1 4/2015 Sigoure
2015/0127971 A1 5/2015 Arroyo et al.
2015/0195192 A1 7/2015 Vasseur et al.
2015/0281015 A1 10/2015 Griffith et al.
2015/0317197 A1 * 11/2015 Blair ..................... H04L 41/147 714/47.3
2016/0020800 A1 1/2016 Krishnamoorthy et al.
2016/0021173 A1 1/2016 Tapia
2016/0036636 A1 2/2016 Erickson et al.
2016/0057052 A1 * 2/2016 Zhang ................... H04L 45/745 709/239
2016/0301558 A1 10/2016 Twiss
2016/0301579 A1 10/2016 Djukic et al.
2016/0373302 A1 12/2016 Sigoure et al.
2017/0048126 A1 2/2017 Handige Shankar et al.
2017/0070387 A1 3/2017 Rao et al.
2017/0078956 A1 * 3/2017 LeBlanc ............... H04L 45/308
2017/0085488 A1 3/2017 Bhattacharya et al.
2017/0109260 A1 4/2017 Wang et al.
2017/0264509 A1 * 9/2017 Wanser ............... H04L 41/0816
2017/0277572 A1 * 9/2017 Suit ..................... H04L 41/0816
2018/0173557 A1 * 6/2018 Nakil .................. H04L 43/0852
2018/0242387 A1 8/2018 El Khayat et al.
2020/0204445 A1 6/2020 Sigoure
2020/0244556 A1 7/2020 Shevade et al.

* cited by examiner

STATE AND STATUS DATA SYSTEM - 300

NETWORK FAILURE PREDICTION LOGIC - 700

PREDICTIVE ANALYSIS SYSTEM - 800

DATA ANALYTICS ON INTERNAL STATE

RELATED APPLICATIONS

Applicant claims the benefit of priority of prior, provisional application Ser. No. 62/182,942, filed Jun. 22, 2015, the entirety of which is incorporated by reference.

Applicant also claims the benefit of priority of prior, provisional application Ser. No. 62/263,487, filed Dec. 4, 2015, the entirety of which is incorporated by reference.

FIELD OF INVENTION

This invention relates generally to datacenter networking and more particularly to analyzing captured internal state of a network element.

BACKGROUND OF THE INVENTION

Traditional enterprise datacenter networks may be susceptible to software crashes and unplanned outages. Multiple, different software releases across switch platforms can make deploying new features and services a lengthy and time-consuming process. Additionally, the manual configuration used within certain datacenter networks may result in configuration errors, which may compromise network uptime or availability. Debugging and analysis of these failures may be made more difficult by a lack of a comprehensive state information associated with erroneously configured or failed network elements. In existing network elements, software state may be queried using synchronous or asynchronous polling that periodically retrieves the internal state of the network element. This polling mechanism may result in wasted cycles, as well as possible deadlocks and/or race conditions during the occurrence of multiple concurrent events. Additionally, existing programming interfaces for retrieving the internal state of a network element may not provide access to certain elements of internal state.

SUMMARY OF THE DESCRIPTION

Various embodiments are described herein to track and/or update the state of components within a network element. One embodiment provides for a network management system comprising a collector node including an ingest gateway to receive configuration state and operational status data of a set of network elements coupled to the collector node via the network, the collector node further to store the configuration and status data from the set of network elements in a distributed database; a search engine to locate and retrieve the configuration and status data of a specified subset of the network elements at a specified time period; and an interface server to receive a request for the configuration and status data from an external requester, the interface server to facilitate provision of the state and status data in response to the request.

One embodiment provides for a non-transitory machine-readable medium storing instructions which, when executed by one or more processors, cause the one or more processors to perform operations including receiving configuration state and operational status data associated with a first set of network elements, the state and status data associated with a time period encompassing a network failure involving one or more network elements in the set of network elements; applying an initial state and status associated with the set of network elements to a second set of network elements; and sequentially applying recorded state and status updates to the second set of network elements to determine a cause of the network failure.

One embodiment provides for a non-transitory machine-readable medium storing instructions which, when executed by one or more processors, cause the one or more processors to perform operations including querying an interface server of a network management system to request a subscription to configuration state and operational status data associated with a set of network elements monitoring configuration and status data associated with the set of network elements via the subscription; and predicting a future network failure based on the state and status data associated with the set of network elements.

Other methods and apparatuses are also described. For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
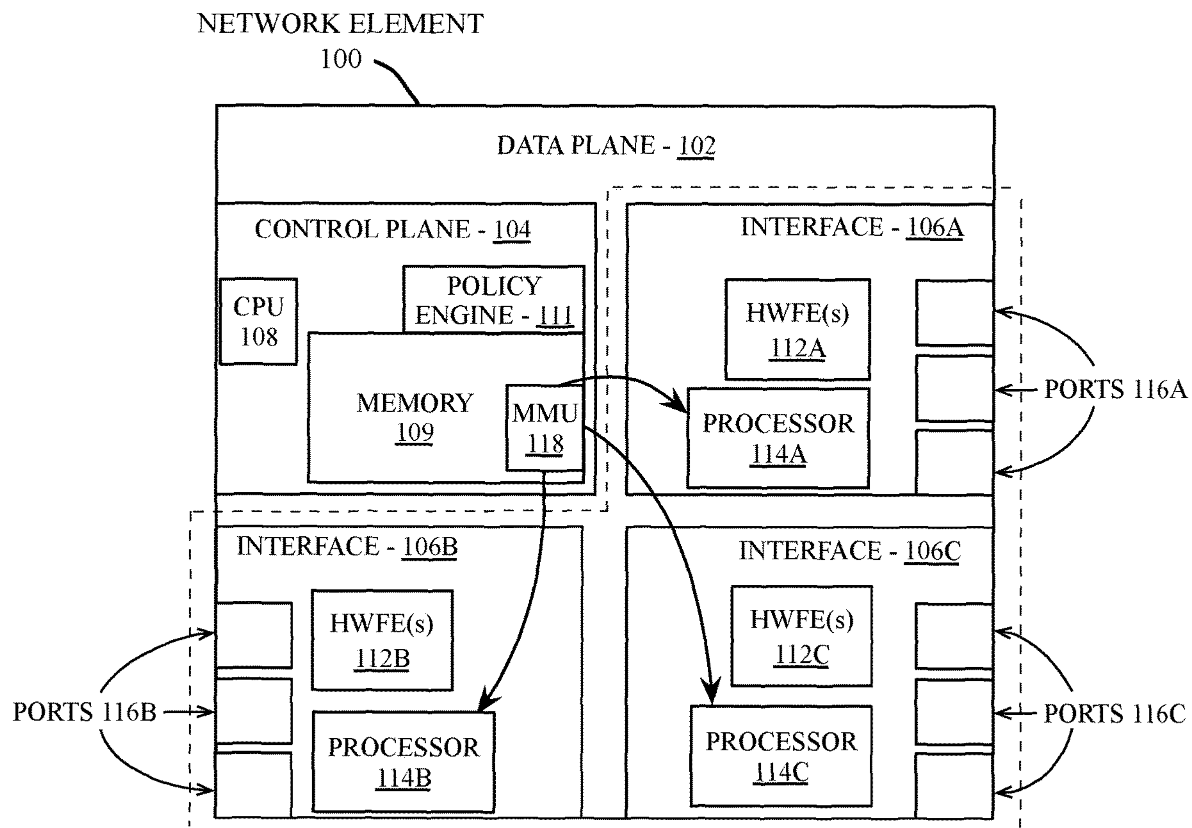
FIG. 1 is a block diagram of one embodiment of a network element including a data plane coupled to a control plane and several interface devices.

Embodiments described herein provide a distributed network management system for receiving data streamed from a network element (e.g., switch, router, etc.) having extensible operating system. The operating system of the network element includes a state and status agent that can be configured to continuously stream all configuration state and operational status changes on the network element. In one embodiment, all changes to the network element, including but not limited to network interface counters, command line changes, network management system based changes, and automatic state changes, are reported in substantially real time to a collector node, or an interface node of the collector node. As opposed to polling systems such as SNMP that can be used to poll or retrieve data from a network element, the state monitoring agent enabled by embodiments described herein actively pushes configuration state and status changes that occur on a network element to a collector node that persistently stores the received changes to a distributed database.

In one embodiment, a state monitoring agent can provide sufficient information to reconstruct the configuration state and status of a specific network element at an arbitrary time in the past. In one embodiment, this information can be pushed back to the network element to restore the network element to a specific historical state. Information for each network element in a datacenter environment can be captured and stored. In one embodiment, captured and stored data can be analyzed for failures and proactive remediation of any detected errors can be performed. In one embodiment the captured and stored data can be used to predict impending network failure due to comprehensive analysis of state and status trends across the network. In one embodiment, captured and stored data from a network failure event can be loaded onto test network elements and the events leading to the network failure event can be replayed on the test network. In one embodiment, the captured and stored data can be loaded onto a testing platform and the events leading to the network failure event can be replayed using a set of virtual network elements operating as virtual machines on the testing platform.

The configuration state and operational status updates can be transmitted as in-band transmissions over the production network or as out-of-band transmissions over a dedicated management link. In one embodiment, the updates are transmitted to one or more collector nodes that aggregate the data from multiple network elements. A group of network elements can be configured with a direct link to a collector node or the update information can be forwarded across the network to one or more data-center collectors. In one embodiment, where updates are forwarded across the network the transmission rate of updates can dynamically adjusted to not interfere with other network data (e.g., via QoS policy or traffic class settings).

Embodiments of the invention may be implemented on parallel processing systems that implements centralized management or implements distributed management. For example, certain aspects of some embodiments may be implemented using an Apache Hadoop system. However, those skilled in the art will appreciate that the invention is not limited to Hadoop. Rather, embodiments of the invention may be implemented with other parallel processing systems without departing from the invention. For example, embodiments of the invention may be implemented on any distributed storage system (e.g., Ceph), any distributed compute system (e.g., YARN, Gearman, Sidekiq, etc.) and/or any distributed database system (e.g., HBase, Cassandra, etc.). In one embodiment, the aggregated state for connected network elements is stored in a large scale, distributed database, such as the HBase, or another suitable database.

The network management system is configured to handle semi structured, schema less (self describing) state in a generic fashion; persistently store state and all state updates; provide a publisher-subscriber system to enable applications to subscribe to any piece of state; and provide secure multi-tenant, highly available access to the state.

Storing semi structured, schema less, and generic state indicates that the system no a priori knowledge of the state that will be handled. Instead the format of the state is embedded within the data and different fields of data are nested in a hierarchical fashion. A JSON document or a Python dictionary are examples of generic, semi structured pieces of state, unlike, for example, the internal state associated with the network element operating system and forwarding engine state, which follows a rigid, pre established structure.

The collected state is persisted indefinitely within a distributed database, along with any updates to the collected state. The state collection is performed in a manner that allowed the system to determine the state of a network element at any arbitrary point in time, as well as how the state of the network element evolved within a given time window. The system can be configured to implement a publisher-subscriber pattern in which notifications are relayed between different components and applications to enable real-time sharing. Embodiments provide notification granularity in the millisecond range, enabling components to respond to state updates in near real time.

The system can be constructed as a multi-tenant system, where data for different tenants, customers, clients, organizations, networks, datacenters, etc., are stored within the same distributed system and the different tenants are not able to see or interact with the data associated with other tenants. Accesses to the databases are gated by application programming interface (API) servers that perform authentication and enforce access restrictions. Additionally, system data may be persisted across multiple replicas and spread across different failure domains and safeguards are in place to prevent the permanent loss of any amount of data.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of d operations, it should be appreciated that some of the operations described may be performed in a different order. Moreover, some operations may be performed in parallel rather than sequentially.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C. Where the network element 100 is a virtual network element, software forwarding engines are used in place of the hardware forwarding engines 112A-C. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive and/or forward network traffic, where the network traffic is processed by the hardware forwarding engines 112A-C (or software forwarding engines) after receipt and/or before being forwarded to a next hop. Each of the interface devices 106A-C includes multiple ports 116A-C that are used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can be used to program the hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NETCONF), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a memory management unit (MMU) 118 coupled to the memory 109 to allow processors 114A-C direct access to the memory 109. In one embodiment, the MMU 118 allows the processors 114A to directly access memory 109 without requiring the CPU 108 in the control plane 104 to send data to each processor 114A-C. In one embodiment, the control plane 104 includes a policy engine 111 to define a QoS policy to be implemented by the hardware forwarding engines 112A-C on network traffic flowing through the network element 100. For example and in one embodiment the policy engine 111 can configure a QoS policy to minimize the latency of some type of network traffic, or to apply traffic shaping policies on the overall flow of traffic through the network element, or within a larger network topology. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 100 communicates network data between various networked devices using a variety of communicating techniques (e.g., layer 2 switching, layer 3 routing, traffic shaping, applying a quality of service (QoS) policy, etc.).

Figure 2:
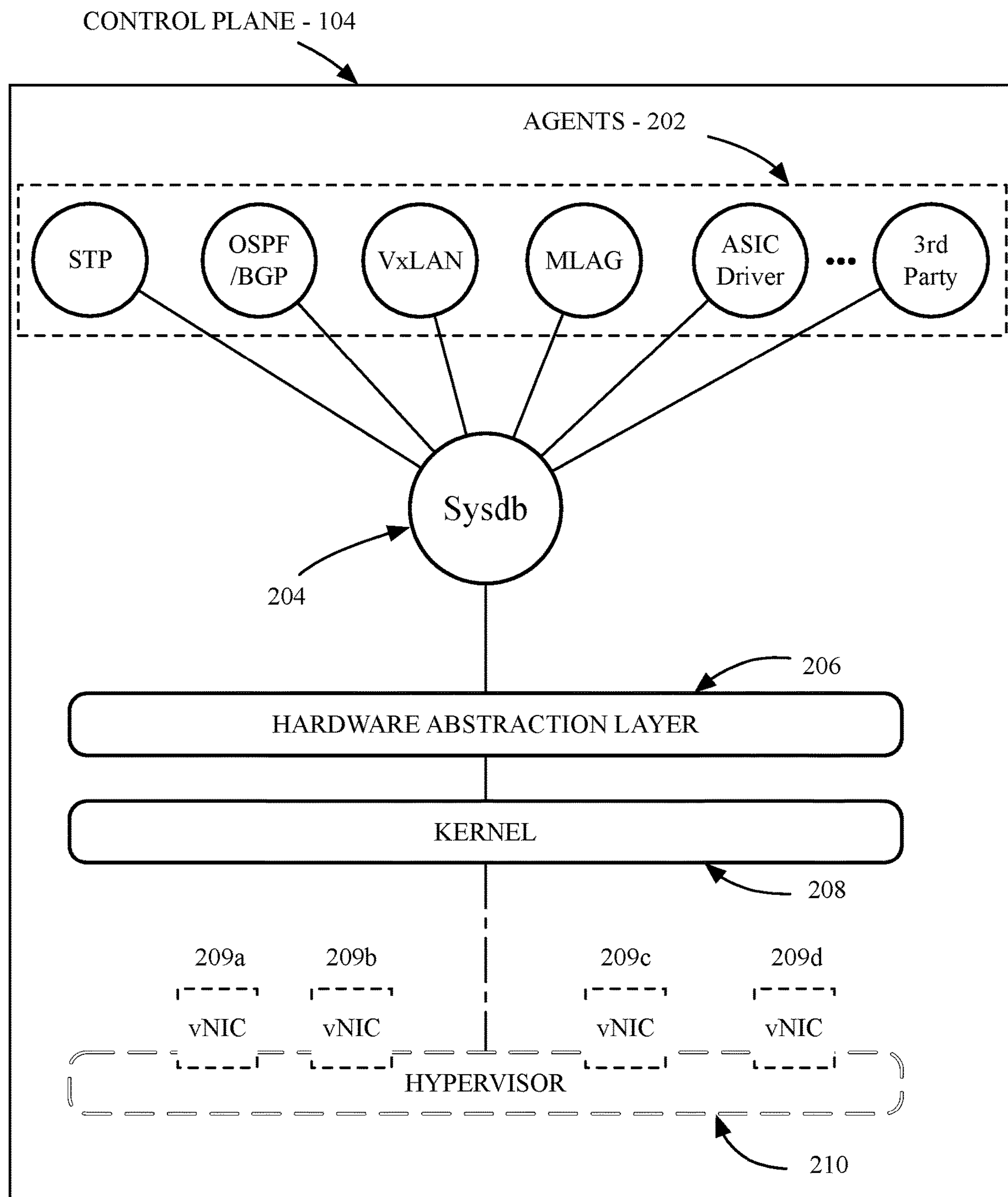
FIG. 2 is a block diagram of a network element software system, according to an embodiment.

FIG. 2 is a block diagram of a network element software system 200, according to an embodiment. In one embodiment, the network element software system 200 resides in the control plane (e.g., control plane 104) of a network element 100 as in FIG. 1. The network element software system 200 includes multiple software agents 202 including, but not limited to agents to perform operations to implement Spanning Tree Protocol (STP), Open Shortest Path First (OSPF)/Border Gateway Protocol (BGP), Virtual eXtensible LAN (VxLAN), and Multi-Chassis Link Aggregation (MLAG). The agents can additionally include one or more forwarding ASIC drivers as well as third-party agents. In one embodiment, the agents each communicate with a central system database (e.g., Sysdb 204). In one embodiment, the software system 200 additionally includes a hardware abstraction layer 206 to abstract hardware specific details to enable the network element software system 200 to operate on a variety of different hardware associated with different models and implementations of network elements. A kernel 208 provides core operating system functionality such as scheduling and base level system resource management. In one embodiment, the network element software system 200 can be operated within a virtual machine, and can provide virtual network interface cards (vNIC 209*a-d*) via a hypervisor 210.

In one embodiment, each of the multiple agents 202 interfaces with the Sysdb 204 to record configuration state and operational status. In such embodiment, agents in the system mount can send and receive configuration and status data to and from Sysdb 204 to send and receive configuration and status. Read and write permissions can be specified for each mount. In one embodiment, Sysdb utilizes an event-driven publish/subscribe model. If the configuration state of an agent changes, Sysdb can send an event notification to that agent, which will then update its local copy. Similarly when the agent writes to the Sysdb mount, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include a sufficient amount of sufficiently high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in shared memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

State and Status Data Streaming

The network element software system provides mechanisms to monitor the state and status of a network element from within the network element. However, software system implementations on the network elements generally do not focus on persisting the current state or storing extensive records of historical state. Embodiments described herein provide a state and status collection and persistence system that actively and generically gathers state from data sources within the network element in an indiscriminant fashion. With the intent to gather configuration and status changes for all available sources within a network element, including from various levels of the control plane software system (e.g., agent state, system logs, kernel state), shared memory system (e.g., routing tables, shared memory counters), and platform specific hardware state (e.g., hardware internal counters, buffer analysis data, etc.).

Figure 3:
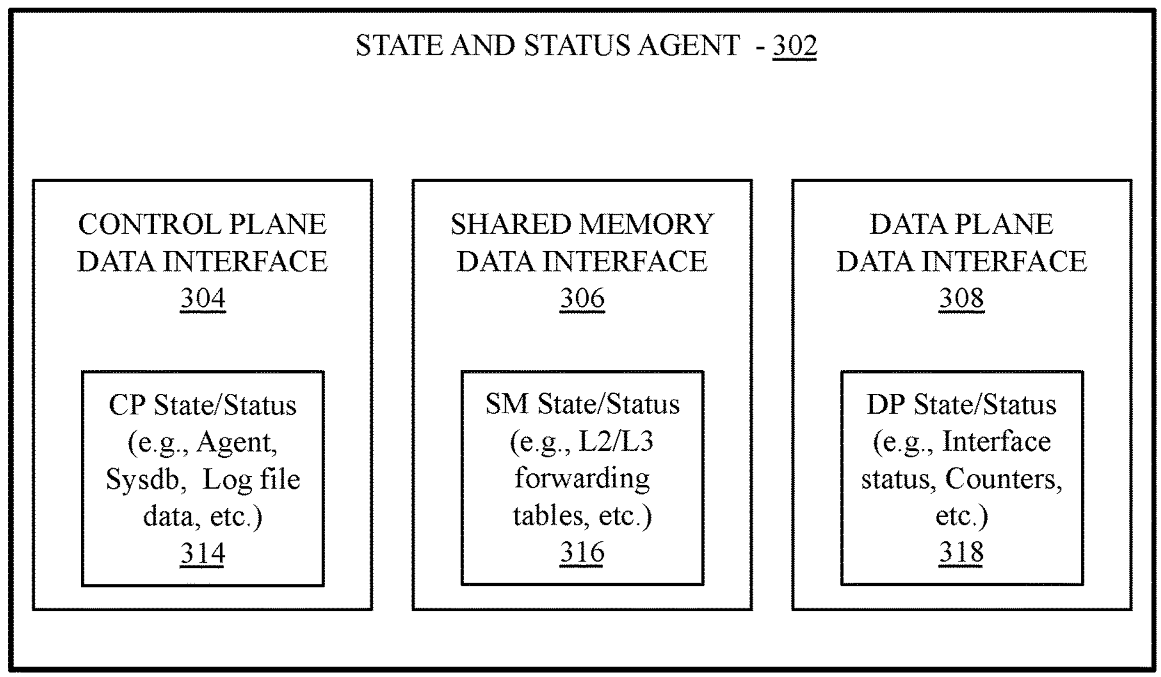
FIG. 3 is a block diagram of a network element state and status data system, according to an embodiment.

FIG. 3 is a block diagram of a network element state and status data system 300, according to an embodiment. The state and status data system 300 includes a state and status agent 302 that can be configured to report any configuration state and operational status changes of a network element. In one embodiment, each network element within the network includes a state and status agent and the state and status changes are transmitted as in-band data along with production network data serviced by the network element. The state and status agent 302 can stream data from multiple data sources. Each data source can provide an interface to the state and status data including, but not limited to control plane data interface 304, shared memory data interface 306, and data plane data interface 308.

The control plane data interface 304 can provide access to control plane state and status 314 including the status of control plane agents, sensor data, control plane processor events, Sysdb status or status of other system databases, including system log file data throughout various level of the network element software system 200 of FIG. 2. The state and status agent 302 can subscribe to updates for each element of the software system and any update to the configuration state or operational status of the subscribed element will cause a notification to be sent to the state and status agent 302. The state and status agent 302 can then automatically stream the update.

The shared memory data interface 306 can provide access to shared memory configuration and status 316. In one embodiment, the shared memory data interface 306 includes one or more hash tables (not shown) that are stored in memory that is shared between the control plane and the data plane. The shared memory includes tables to store configuration data such as layer-2 (L2) and layer-3 (L3) forwarding, security configuration data such as access control list (ACL) data, QoS data, or other network traffic processing information. In one embodiment the shared memory is configured using a writer-reader paradigm, such that the control plane can perform atomic, wait-free writes to the shared memory tables and the data plane consumers of the shared memory tables are automatically notified of any modifications to the tables. Using such mechanism, the shared memory data interface 306 can be configured to automatically receive notification of any changes to shared memory data and provide the changed data to the state and status agent 302.

The data plane data interface 308 can provide access to data plane configuration and status 318 including but not limited to the status of each interface on the data plane and hardware interface counter data associated with those interfaces. The status of each interface can include a link status of each interface port and a configured data rate of each interface port. Interface counter data includes but is not limited to a count of network data units (e.g., packets) received and transmitted via the interface, including a number of broadcast or multicast packets sent and received, output errors, collisions, and data that can be used to monitor interface status and performance.

As data plane information can change very rapidly, the data plane interface 308 can include a deep set of buffers and queues to store rapidly changing data plane counter information before the state and status agent 302 streams the information over the network to a collector node on the network. In one embodiment, data may be coalesced before transmission, such that a set of updates from the data plane can be collected and transmitted in bursts. Status updates may be queued in a coalescing queue until transmission. Should the coalescing queue fill, a map data structure may be used to store additional information until the coalescing queue drains sufficiently to store the incoming data. In some scenarios, certain data can be dropped or discarded in the coalescing map to make room for newer data. For example, older counter data can be dropped to store later received counter data.

In one embodiment, the coalescing mechanism can be applied by all data interfaces, including the control plane data interface 304 and the shared memory data interface 306. In one embodiment, the state and status agent 302 may coalesce data for transmission, for example, when the update rate from the interfaces exceeds the data stream transmission rate for a period of time.

The updates can be transmitted to one or more collector nodes that aggregate the data from multiple network elements. A group of network elements can be configured with a direct link to a collector node or the update information can be forwarded across the network to one or more data-center collectors. In one embodiment the state and status agent 302 can stream configuration state and operational status updates as in-band transmissions over the production network. Alternatively, the state and status agent 302 can be configured to utilize out-of-band transmissions over a dedicated management link. Where updates are forwarded across the production network the transmission rate of updates can dynamically adjusted to not interfere with other network data (e.g., via QoS policy or traffic class settings).

Figure 4:
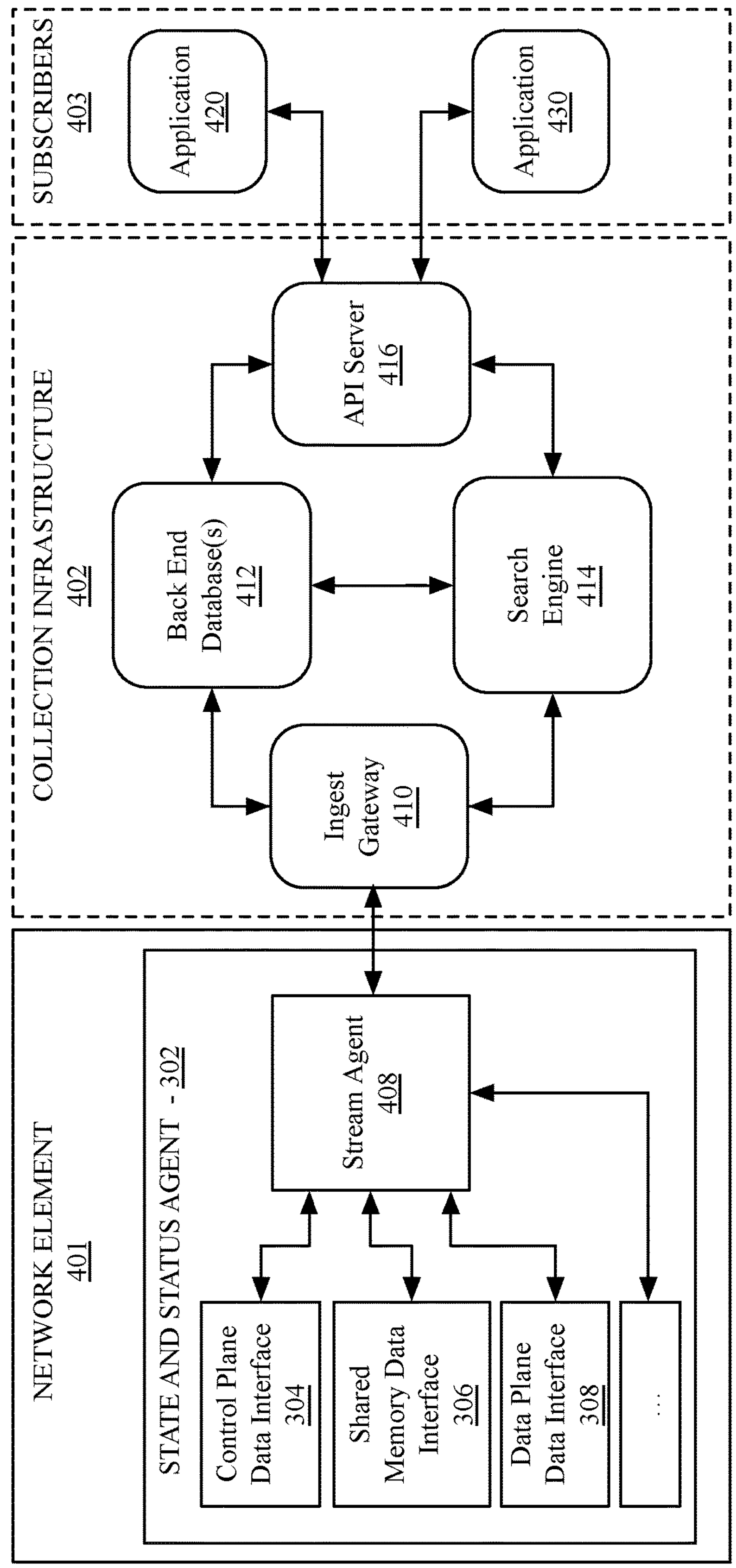
FIG. 4 is a block diagram of a state and status data collection system, according to an embodiment.

FIG. 4 is a block diagram of a state and status data collection system 400, according to an embodiment. The state and status data collection system 400 includes an network element 401, which may be any network element described herein, a collection infrastructure 402, and a set of subscribers 403. Data from the network element 401 is streamed to the collection infrastructure 402, which is a distributed system configured to collect and store state and status information from network elements across the network and provide access to the stored data to the set of subscribers 403, which may be data processing system application, including third-party data processing system applications, or components of a network management system. The subscribers 403 can use the collection infrastructure to receive selected subsets of the state and status information from a selected subset of network elements.

The network element 401 can stream the state and status data, in one embodiment, using the state and status agent 302 described in FIG. 3. The state and status agent 302 is configured to stream state and status information to the collection infrastructure 402 via a stream agent 408. The stream agent 408 can be configured to continuously stream configuration state and operational status data received from data interfaces, including, but not limited to the control plane data interface 304, shared memory data interface 306, and data plane interface 308 described in FIG. 3. In one embodiment the state and status agent 302 can be configured to interface with additional data sources that provide operational status for software and hardware of the network element 401, such as third-party interfaces for third-party software or hardware modules installed within the network element 401. In general, the stream agent 408 can subscribe to, request, access, monitor, or interface with all available state and status sources of the network element.

The stream agent 408 can be configured to stream data to an ingest gateway 410 of the collection infrastructure 402. The stream agent 408 can convert any structured data retrieved via the data interfaces into the semi structured, schema less format in which the configuration state and operational status data and updates are streamed to and stored within the collection infrastructure 402. The collection infrastructure 402 is a distributed system that can be executed on a compute cluster in an arbitrary location within a data center or as an off-site distributed cloud service. Any number of network elements from any number of tenants or data centers can connect to the collection infrastructure 402. The ingest gateway 410 may be one of potentially multiple accessible ingest gateways accessible to a stream agent 408 of the network element 401. In one embodiment the stream agent 408 of each network element is configured to locate and connect to an accessible ingest gateway during initialization and begin streaming data to the connected ingest gateway 410.

Each ingest gateway 410 can be configured to validate the alleged identity of each connected instance of the stream agent 408 and then persist the received data stream via one or more backend database(s) 412. In one embodiment the one or more backend database(s) 412 include a distributed database utilizing technologies such as HBase™ Kafka™, or other similar systems such as Cassandra™ or DynamoDB®. As state and status updates are received by the ingest gateway 410, the updates are persisted to the backend database(s) 412 and are also routed to any of the subscribers 403 that are subscribed to the state being updated. In one embodiment a publisher-subscriber system is used to route the updates to subscribers 403 via one or more instances of an API server 416 that is configured to listen to an "event bus" of the publisher-subscriber system on behalf of the subscribers 403. Via the API server 416, subscribers can access data at least in part using a search engine 414, which may be based on technologies such as Elasticsearch®.

In one embodiment the stream agent 408 of the network element 401, in addition to streaming updates, can also receive updates from the collection infrastructure 402 to apply to the network element 401. In such embodiment the data interface links are bi-directional, such that state may also be written out to the various data interfaces (e.g., the control plane data interface 304, shared memory data interface 306, data plane data interface 308, etc.) based on updates received via the stream agent 408. For example, a subscribing application 420 can be configured to utilize the collection infrastructure 402 such that the subscribing application 420 can react to any piece of state changing from any network device or other network accessible application by updating the state of the network element 401. Subscribers 403 can thus react to update notifications in near real-time.

Should the subscribing application 420 decide to send an update to a network element, the API server 416 can authorize the update and route the update across the network to the appropriate destination. For example, if the subscribing application 420 is to send an update to the network element 401, the update is routed to the ingest gateway 410 currently connected to the network element. The update is then pushed to the stream agent 408, which locally applies the update. In one embodiment the stream agent 408 has ultimate authority over whether an update can be applied, as some elements of configuration status or operational state cannot be updated. For example, while some interface counters on the network element may be reset, an arbitrary value may not be written to those counters. Additionally, certain sensor data may not be written. As the steam agent 408 has ultimate authority on over whether an update can be applied, an update is not considered committed until a notification is emitted by the stream agent 408 back to the ingest gateway 410 that conveys the state update, which will propagate through the rest of the system similar to other updates. Should the update fail to apply locally, the stream agent 408 can return an error response to the source of the update (e.g., subscribing application 420) through the ingest gateway 410.

In one embodiment one or more of the subscribers 403 may be applications configured as analysis and/or monitoring agents configured to analyze the state and status information related to a failure event associated with the network or monitor one or more components of the network to predict whether a failure event is to occur. For example, application 430 may be a monitoring/analysis agent that subscribes to a subset of the state and status updates associated with the network element 401 to predict an impending failure of a hardware or software component of the network element or a network operational failure associated with the network element. The application 430 can also be configured to detect misconfigured network elements and automatically correct the misconfiguration or take other steps to prevent the misconfiguration from impacting the network as a whole (e.g., offline one or more interfaces).

The application 430 can monitor a varied set configuration state and operational status data across a set of network elements, including changes to control plane state, shared memory data, or data plane state, to detect events that are known to correlate with an impending failure. For example, the application 430 can search for an increase in errors counted on certain network interfaces on a network element, which may indicate potentially failing hardware. The application 430 can also perform operations including monitoring the link status of one or more interface ports in the set of network elements, or detecting a network element having a misconfigured data rate. The application 430 can also monitor the STP state associated with a set of network elements, for example, to detect STP convergence events. The application 430 can also be configured to monitor changes in forwarding protocol state, including changes to MAC address tables and routing tables.

In addition to proactive monitoring, the application 430 can also be configured to respond to a failure event that occurs on the network by automatically retrieving a subset of the state and/or status associated with network elements associated with the failure event. Additionally, network support personnel may configure the application 430 to query a subset of the state and status information associated with a selected set of network elements within a specified period of time. For example, in response to a request for support following a network failure, the state and status of the failed network elements or the state and status of network elements or devices associated with a network failure event can be retrieved and analyzed.

Via the ability to re-inject configuration or state changes back into a network element, some network failure events can be remotely resolved by re-injecting a known good configuration into a set of network elements, for example, in response to an error caused by a misconfiguration. Additionally, the state and status of the network elements can be queried and injected into a set of test network elements via a system and process described further in FIG. 5.

Figure 5:
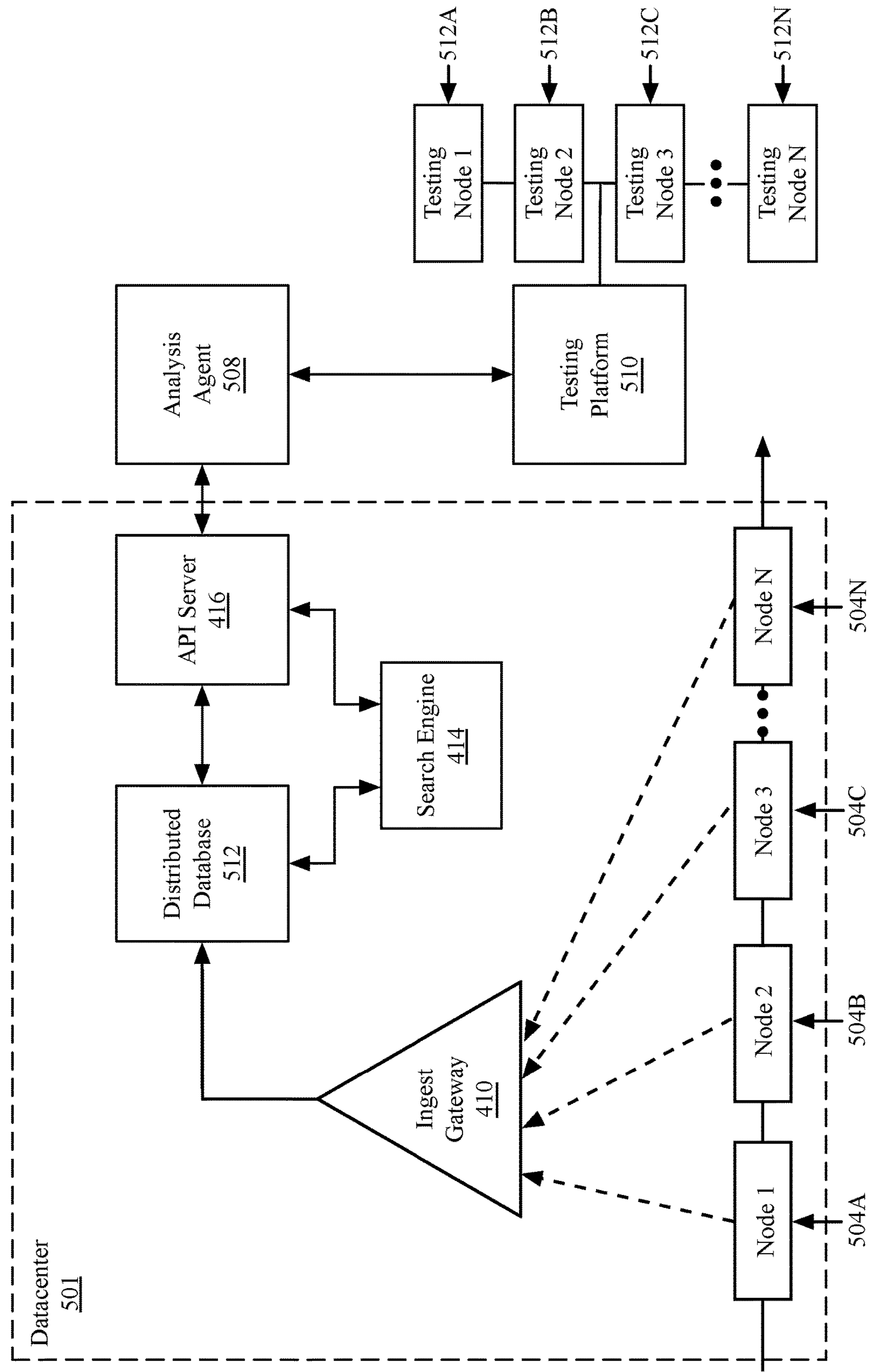
FIG. 5 is a block diagram of illustrating a state and status collection and analysis system, according to an embodiment.

FIG. 5 is a block diagram of illustrating a state and status collection and analysis system 500, according to an embodiment. In one embodiment state and status collection and analysis system 500 includes a datacenter 501 having an infrastructure similar to the collection infrastructure 402 of the state and status data collection system 400 of FIG. 4. The datacenter 501 includes multiple network nodes 504A-N connected to the ingest gateway 410 of the collection infrastructure. The network nodes 504A-N may be network elements or other network devices configured to stream state and status information. The ingest gateway 410 can store the received data into one or more back end databases including one or more nodes of a distributed database 512 on site at the datacenter 501. The API server 416 provides a mechanism to stream updates to the state and status information collected from the network nodes 504A-N to subscribing applications and can couple to the search engine 414 to locate specific subsets of stored state.

In one embodiment an analysis agent 508, in response to a failure event on the network, can request a set of state and status data for a subset of the nodes 504A-N that are associated with the failure event. The analysis agent 508 can request a complete set of data that may be used to initialize a set of network elements to an initial state, as well as a set of sequential updates to the network elements between the initial state and the state associated with the failure event. This set of data can be analyzed to determine any potential causes of failure. In one embodiment, an automated analysis process can be performed on the retrieved state to determine if potential causes of failure can be automatically determined based on analysis of the configuration state and operational status of the network nodes before, leading to, and after the failure event.

In one embodiment, the analysis agent 508 can employ the use of a testing platform 510. The testing platform 510 can be a network server or other networked computing device, or can be a component of a network management system executing on a networked computing device or distributed across multiple computing devices or network elements. The analysis agent 508 can use the testing platform 510 to replay the events represented by the configuration and status data on one or more testing nodes 512A-N. The testing nodes 512A-N can be initialized with retrieved state and status associated with one or more of the set of network nodes 504A-N involved in the failure under analysis. The testing nodes 512A-N can then be progressively and incrementally stepped towards the network state associated with the failure event. This process may be of particular importance when attempting to diagnose a failure that is otherwise difficult to reproduce.

In one embodiment the testing platform 510 is a server computing device and the testing nodes 512A-N are a set of physical network elements that are electrically or electromagnetically coupled to the testing platform 510 (e.g., via a wired or wireless link). The testing platform 510 can receive the state and status configuration data via the analysis agent 508 and deploy the configuration data to any number of testing nodes 512A-N that are necessary to reproduce the failure event. The testing platform 510 can deploy the configuration data to the testing nodes 512A-N by pushing the data through a stream agent (e.g., stream agent 408 as in FIG. 4) on the network element associate with each of the testing nodes 512A-N. Updates to the operational state, such as routing table changes, link state changes, etc., can also be deployed to the testing nodes 512A-N.

In addition to physical network elements, the one or more of the testing nodes 512A-N may be virtual network elements. The virtual network elements may be executing in a virtual machine on a computing platform connected to the testing platform 510, or may be virtual machines executing on the testing platform. In one embodiment the testing platform 510 may also execute within a virtual machine. For example, the testing platform 510 may be or execute within a virtual machine executing on a host platform or network management system that also executes the analysis agent 508. The analysis agent 508 may also execute within a virtual machine, or may be a component of a network management system.

Network Management System Integration

Components of the state and status data system and data collection system of FIGS. 4-5 can be integrated into a network management system as a uniform mechanism for retrieving operational status and/or configuration state of network elements in a network managed by the network management system. The state and status data system can also be used to allow the network management system to push configuration changes to network elements within the system.

Figure 6:
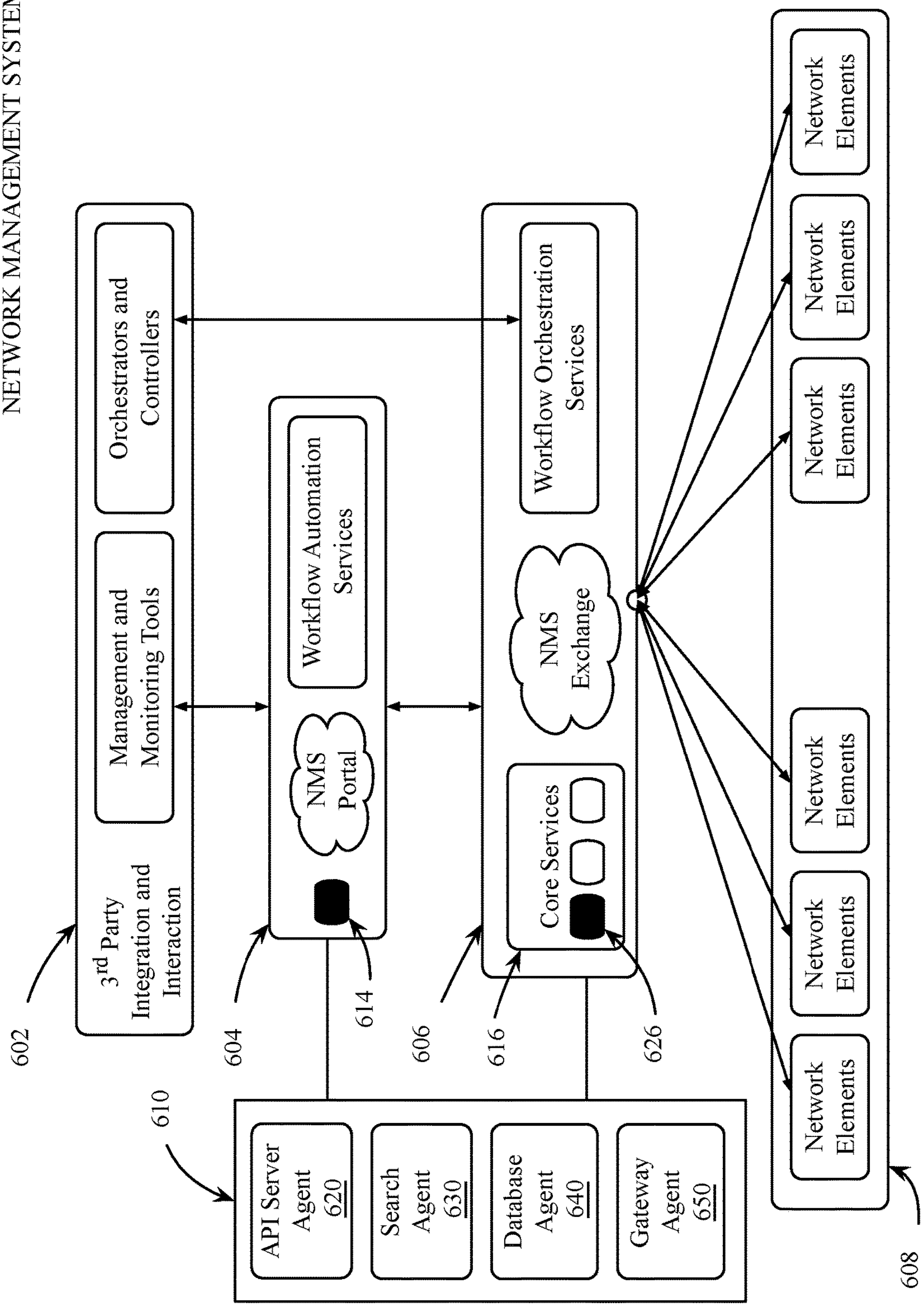
FIG. 6 is a block diagram of a network management system, according to an embodiment.

FIG. 6 is a block diagram of a network management system 600, according to an embodiment. The network management system 600 may be a variant of the CloudVision® Framework provided by Arista Networks™ of Santa Clara, Calif. In one embodiment the network management system 600 has a multi-layer/multi-tier architecture including a 3$^{rd}$ party integration and interaction layer 602, a network management system (NMS) portal layer 604, and an NMS exchange layer 606. The network management system 600 may execute as a VM based virtual server on a network management device. Additionally, one or more portions of the network management system 600 may also be configured to execute within the control plane of a one or more network elements within the network.

The 3$^{rd}$ party integration and interaction layer 602 can include management and monitoring tools, as well as orchestrators and controllers that are provided by 3rd party service providers to manage and control a set of network devices. The 3$^{rd}$ party service provider tools in the 3$^{rd}$ party integration and interaction layer 602 can communicate with an NMS portal layer 604. The NMS portal layer 604 provides a mechanism for the network to achieve cloud scale automation without significant additional development effort. In one embodiment, the NMS portal layer 604 includes workflow automation services that automate network services and provide zero touch provisioning capability for network elements in a network element layer 608, such that network elements may be coupled to the network and centrally provisioned via software. For example, a set of binary software images for the network elements in the network element layer 608 can be stored in a repository and staged for loading onto the network element.

The NMS portal layer 604 can communicate with an NMS exchange layer 606. The NMS exchange layer 606, in one embodiment, is a network-side multi-function control point that may be configured to execute on a network element in the network element layer 608 or can be deployed as virtual machine executing on a host coupled to a network element. The NMS exchange layer 606 includes a set of workflow orchestration services and core services 616 that provide core management services for the network management system. Once the NMS exchange layer 606 is deployed, network elements can be connected to provide a single point for real-time provisioning, orchestration and integration with multi-vendor (e.g., 3$^{rd}$ party) controllers. Automatic topology discovery can be performed to utilize state and status information received from each network element in the network element layer 608. The received state and status information can be aggregated and used to provide an overview of the functions and operations of each network element in the network. In one embodiment, a VXLAN Control Service (VCS) enables VXLAN learning by leveraging information available via the NMS exchange layer 606 instead of using multicast flooding.

In one embodiment the core services 616 provided by the NMS exchange layer 606 include a state and status integration agent 626 that can couple to a collection and configuration interface 610. The collection and configuration interface 610 can be a variant of and/or coupled with components of the collection infrastructure 402 of the state and status data collection system 400 of FIG. 4. A similar state and status agent 614 can be included to provide access to the collection and configuration interface to the NMS portal layer 604. While the various components of the network management system 600 may include internal mechanisms to communicate with, query status for, and otherwise remotely manage network elements in the network element layer 608, the collection and configuration interface 610 can provide a uniform interface for components of the network management system 600 to perform such functionality.

The collection and configuration interface 610 can include an API server agent 620, a search agent 630, a database agent 640 and a gateway agent 650. The API server agent 620 can provide an interface to an API server to enable subscription to or retrieval of configuration state and operational status collected from the devices on the network. For example, the NMS portal layer 604 and NMS exchange layer 606 can connect to the API server agent 620 to configure API server subscriptions to selected state and status data for select network elements in the network element layer 608. Components in the NMS portal layer 604 and/or NMS exchange layer 606 can also use the API server agent 620 to configure the collection and configuration interface 610 to push configuration changes to select network elements in the network elements layer 608. The API server agent 620 can service requests from components of the network management system 600 using the search agent 630 and database agents 640, which provide interfaces into the backend databases and search engines used to query the backend databases and can also be used by the network management system to configure aspects of the search engines and backend databases. The gateway agent 650 can be configured to provide an interface to the network management system 600 the set of multiple ingest gateways on the network that are configured to receive and submit state and status data to and from network elements in the network element layer 608.

Network Failure Prediction and Analysis Logic

Figure 7:
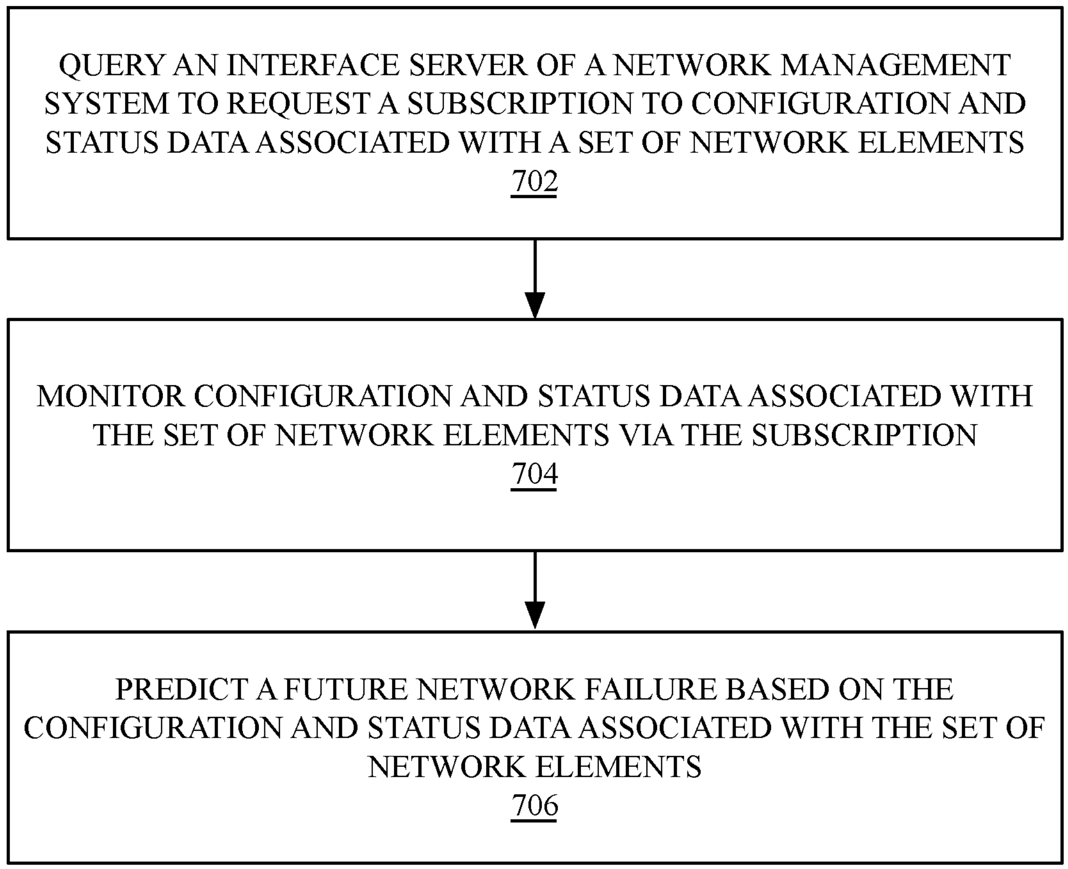
FIG. 7 is a flow diagram of network failure prediction logic, according to an embodiment.

FIG. 7 is a flow diagram of network failure prediction logic 700, according to an embodiment. The network failure prediction logic 700 can be performed by any subscriber to configuration state and operational status, such as the subscribers 403 of FIG. 4. The analysis agent 508 of FIG. 5 may also be configured to perform operations provided by the network failure prediction logic 700. For example and in one embodiment the analysis agent 508 includes predictive analysis logic 810 as described in FIG. 8 below.

In general, as shown at block 702, the network failure prediction logic 700 is configured to query an interface server of a network management system to request a subscription to configuration and status data associated with a set of network elements. The network management system can be the network management system 600 of FIG. 6 and/or the collection infrastructure 402 of FIG. 4. Once a subscription is formed, the network failure prediction logic 700 can receive a stream of the subscribed data for each network element in the set of network elements.

At block 704, the network failure prediction logic 700 can monitor the configuration and status data associated with the set of network elements via the subscription established as a result of the operation at block 702. The network failure prediction logic 700 can, based on the monitoring, attempt to predict a future network failure based on the configuration and status data associated with the set of network elements at block 706. The network failure prediction logic 700 can monitor configuration state and operational status data across the set of monitored network elements. The monitoring can include watching for changes to control plane state, shared memory data, or data plane state, to detect events that are known to correlate with an impending failure, such as an increase in errors counted on certain network interfaces or monitoring link status of one or more interface ports.

Figure 8:
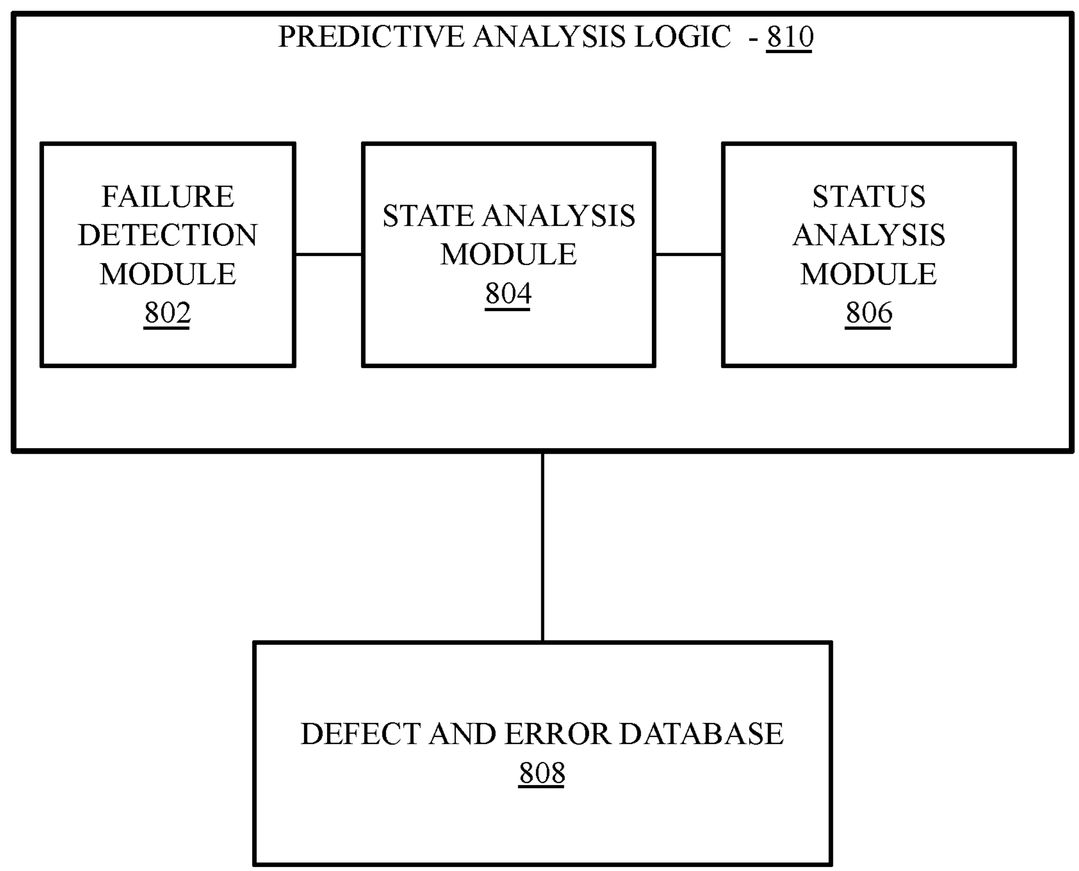
FIG. 8 is a block diagram of a predictive analysis system, according to an embodiment.

FIG. 8 is a block diagram of a predictive analysis system 800, according to an embodiment. The predictive analysis system 800 can be included within any of the subscribers 403 of FIG. 4 or the analysis agent 508 of FIG. 5. In one embodiment the predictive analysis system 800 includes predictive analysis logic 810 including a failure detection module 802, a state analysis module 804, and a status analysis module 806. In one embodiment the state analysis module 804 and the status analysis module 806 can analyze the control plane state/status 314, the shared memory state/status 316, and/or data plane state/status 318 that is reported by the state and status agent 302 of FIG. 3. In one embodiment the predictive analysis system 800 includes a defect and error database 808 coupled with the predictive analysis logic 810. The defect and error database 808 can contain a set of known errors and/or hardware or software defects that have been observed in the components that make up the monitored network elements.

In one embodiment the predictive analysis logic 810 is used to predict a future network failure based on the configuration and status data associated with a set of monitored network elements. The analysis logic 810 may include various analysis algorithms to predict a future failure in hardware and/or software associated with a network element. Examples are provided below that are exemplary of the type of future network errors or failures that may be predicted using the predictive analysis logic. However, embodiments are not limited to these specific examples.

For example and in one embodiment the failure detection module 802 can detect a fan failure in a chassis of a network element and/or the status analysis module 806 can detect a rise in internal temperature that is reported by a temperature sensor associated with a network element. Initially the temperature rise may not be significant enough to cause a hardware failure or trigger thermal alarms configured for the system. However, the predictive analysis logic 810 can determine that failure may be possible and trigger an alert before an actual failure event occurs.

For example and in one embodiment, a sequence of recoverable soft errors, such as single-bit errors or other single event upsets can be detected and used to predict a possible future hardware failure. A soft error can occur when a data bit in memory or in hardware logic is modified due to a noise phenomenon or interference from sub-atomic particles. For example, an increase in chip-level or system-level soft errors detected on a system. In some instances, hardware components with error correction logic can generally detect and correct or recover from such soft errors without issue if the error is a correctable memory error. Often, single-bit errors can be detected and corrected, while multi-bit errors can be detected but not automatically corrected. There is often a correlation between correctable single-bit errors and uncorrectable errors. Thus, an increase in correctable single-bit errors may be used to predict the occurrence of uncorrectable errors. Hardware that exhibits repeated correctable errors is statistically prone to experiencing uncorrectable errors, which may be indicative of faulty hardware. Accordingly, some embodiments can be configured to monitor repeated correctable errors in hardware, so that any potentially problematic hardware can be replaced before the hardware experiences an uncorrectable error that results a system or network outage. By monitoring error recovery status reports via the status analysis module 806, the predictive analysis logic can determine if is a specific component within a network element is displaying an increasing number of single-bit errors and flag that component for analysis.

For example and in one embodiment, using the state analysis module 804 and status analysis module 806, the predictive analysis logic 810 can consult the defect and error database for known software defects that have been reported as being associated with a current configuration or status of a monitored network element. The predictive analysis logic 810 can then determine if a set of non-deterministic errors that are possible, but not necessarily probable, have been observed in other network element having a hardware and software configuration and/or operational status matching or correlating with one or more monitored network elements. The predictive analysis logic 810 can then provide a list of potential defects based on the predictive analysis performed on the state and status information of a monitored network element.

For example and in one embodiment the predictive analysis logic 810 can analyze a set of known traffic patterns and the operational state of monitored network elements to determine if current system forwarding capacity is sufficient for upcoming network loads. For example, a network element may encounter an interface error during off-peak hours, but the interface failure may not degrade network capacity sufficiently to cause an observable drop in network performance at the current load levels. The predictive analysis logic 810, in the event of any capacity reducing failure, can model network throughput based on known cycles and patterns to determine that the current forwarding capacity will be insufficient at a future time, for example, as the network approaches peak load levels.

Figure 9:
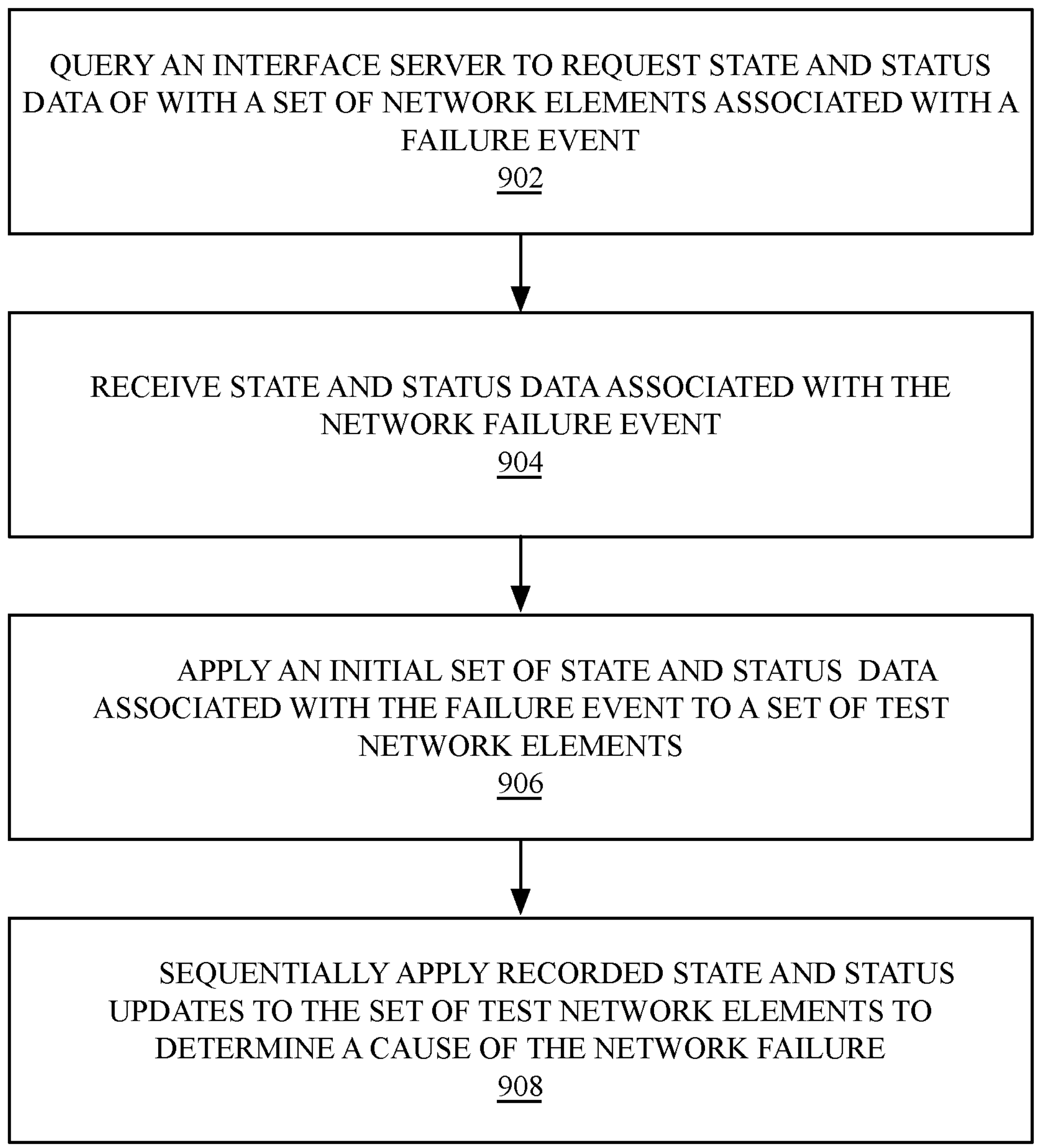
FIG. 9 is a flow diagram of network failure reproduction logic, according to an embodiment.

FIG. 9 is a flow diagram of network failure reproduction logic 900, according to an embodiment. The network failure reproduction logic 900 can be performed, for example, by the analysis agent 508 of FIG. 5. In one embodiment the network failure reproduction logic 900 can query an interface server to request state and status data associated with a set of network elements, as shown at block 902. In response to the request, the logic can receive state and status data associated with the network failure event, as shown at block 904.

The network failure reproduction logic 900 can perform various operations to reproduce a network failure event. In addition to performing one or more automated analysis operations, the network failure reproduction logic 900 can attempt to reproduce the failure event by applying an initial set of state and status data associated with the failure event to a set of test network elements, as shown at block 906. The test network elements can be physical network elements or virtual network elements having virtual network interfaces. The network failure reproduction logic 900, at block 908, can then be configured to sequentially apply recorded state and status updates to the set of test network elements to determine a cause of the network failure.

Exemplary Data Processing System and Modular Network Element

Figure 10:
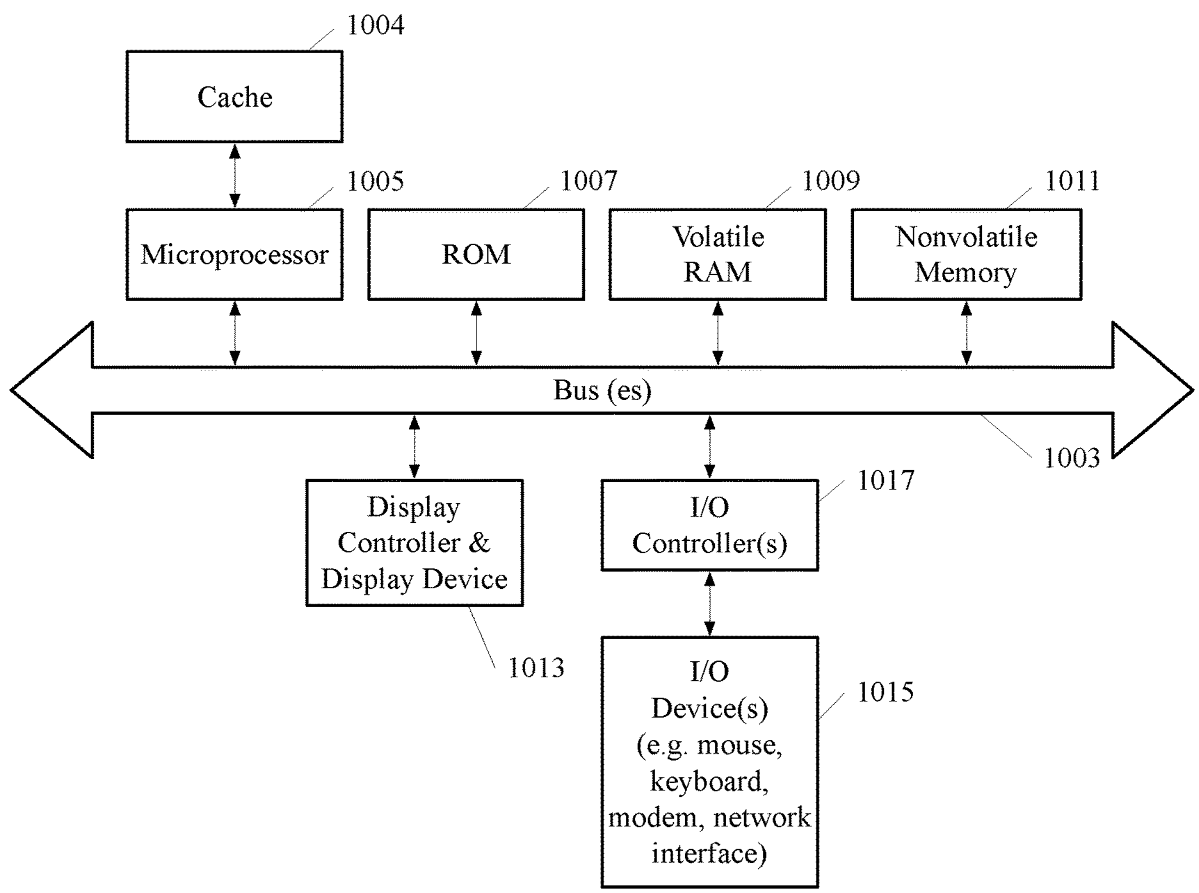
FIG. 10 shows one example of a data processing system, which may be used in accordance with an embodiment.

FIG. 10 shows one example of a data processing system 1000, which may be used with one embodiment of the present invention. For example, the data processing system 1000 may be implemented including one or more of network element 100 as in FIG. 1, or any other network element described herein. In one embodiment, the data processing system 1000 is used within the control plane of a network element described herein. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1000 includes one or more bus(es) 1003 which couple to one or more microprocessor(s) 1005, ROM (Read Only Memory) 1007, volatile RAM 1009 and a non-volatile memory 1011. In one embodiment, the one or more microprocessor(s) 1005 couple to a cache 1004, which can include one or more sets of instruction and/or data caches. The bus(es) 1003 may include one or more buses connected to each other through various bridges, controllers and/or adapters as is well known in the art.

The microprocessor(s) 1005 may retrieve the instructions from the memories 1007, 1009, 1011 and execute the instructions to perform operations described above. Instructions and/or associated data retrieved from the memories 1007, 1009, 1011 may be stored in the cache 1004. The bus(es) 1003 interconnect system components with each other, and to a display controller and display device 1013, and to peripheral devices such as input/output (I/O) devices, which may be mice, keyboards, modems, network interfaces, printers and other devices well known in the art. Typically, the input/output devices 1015 are coupled to the system via input/output controller(s) 1017. The volatile RAM (Random Access Memory) 1009 is typically implemented as dynamic RAM (DRAM), which requires power continually in order to refresh or maintain the data in the memory, but may also include static ram (SRAM), which does not require a periodic refresh.

In one embodiment, the non-volatile memory 1011 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1011 will also be a random access memory although this is not required. While FIG. 10 shows that the non-volatile memory 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of the systems, methods, and devices described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
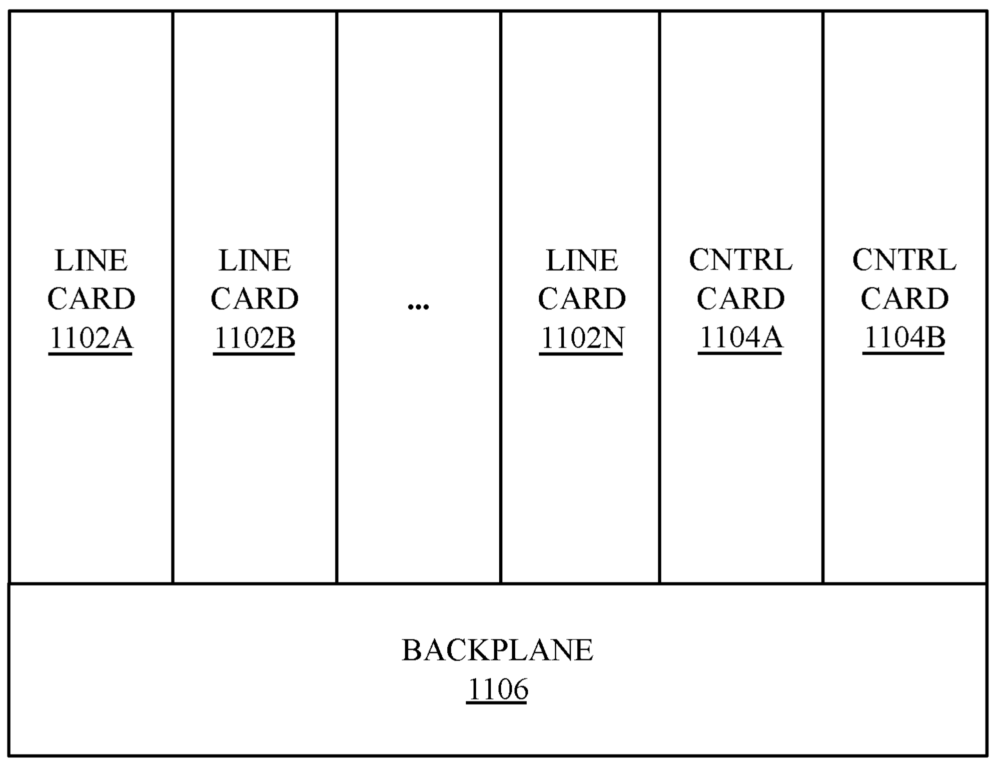
FIG. 11 is a block diagram of an additional embodiment of an exemplary modular network element as described herein.

FIG. 11 is a block diagram of an additional embodiment of an exemplary modular network element 1100 as described herein. In one embodiment, the network element has a modular and expandable configuration that allows the addition or removal of resources configured as line cards 1102A-N, or controller cards 1104A-B coupled to a backplane 1106. In one embodiment, the controller cards 1104A-B control the processing of the traffic by the line cards 1102A-N, which can each include one or more network data forwarding devices such as interfaces 106A-C as in FIG. 1, although the precise nature of the forwarding devices is not limited as such. In one embodiment, the line cards 1102A-N process and forward traffic according to the network policies received from controller cards the 1104A-B. In one embodiment, one or more of the line cards 1102A-N can monitor and report internal performance data, such as latency data for all or selected units of network data traversing the network element. In one embodiment, the controller cards 1104A-B can also be configured to perform all or a sub-set of functions provided by the line cards 1102A-N. It should be understood that the architecture of the network element 1100 illustrated in FIG. 11 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for according to embodiments and examples described herein. Additionally various components described herein can be a means for performing the operations or functions described in accordance with an embodiment.

Various embodiments are described herein to track and/or update the state of components within a network element. One embodiment provides for a network management system comprising a collector node including an ingest gateway to receive configuration and status data of a set of network elements coupled to the collector node via the network, the collector node further to store the configuration and status data from the set of network elements in a distributed database; a search engine to locate and retrieve the configuration and status data of a specified subset of the network elements at a specified time period; and an interface server to receive a request for the configuration and status data from an external requester, the interface server to facilitate provision of the configuration and status data in response to the request.

One embodiment provides for a non-transitory machine-readable medium storing instructions which, when executed by one or more processors, cause the one or more processors to perform operations including receiving configuration and status data associated with a first set of network elements, the configuration and status data associated with a time period encompassing a network failure involving one or more network elements in the set of network elements; applying an initial configuration and status associated with the set of network elements to a second set of network elements; and sequentially applying recorded configuration and status updates to the second set of network elements to determine a cause of the network failure.

One embodiment provides for a non-transitory machine-readable medium storing instructions which, when executed by one or more processors, cause the one or more processors to perform operations including querying an interface server of a network management system to request a subscription to configuration and status data associated with a set of network elements monitoring configuration and status data associated with the set of network elements via the subscription; and predicting a future network failure based on the configuration and status data associated with the set of network elements.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A non-transitory machine-readable medium storing instructions which, when executed by one or more processors, cause the one or more processors to perform operations including:

receiving configuration state and operational status data associated with a first set of network elements, the configuration state and operational status data associated with a time period prior to and encompassing a network failure involving one or more network elements in the first set of network elements, the configuration and operational status data comprising initial configuration state and operational status data associated with the first set of network elements and a set of recorded configuration state and operational status updates;

applying initial configuration state and operational status data associated with the first set of network elements to a second set of network elements; and sequentially applying the set of recorded configuration state and operational status updates to the second set of network elements to determine a cause of the network failure.

2. The medium of claim 1, the operations additionally comprising:

querying a network management system to request the configuration state and operational status data; and receiving, from the interface server, the configuration state and operational status data in response to the request.

3. The medium of claim 2, wherein querying the network management system is performed in response to the network failure.

4. The medium of claim 1, wherein the set of sequential updates to the first set of network elements include updates to the first set of network elements between the initial configuration state of the first set of network elements and a state of the first set of network elements associated with the failure event.

5. The medium of claim 1, wherein applying the initial configuration state and operational status data associated with the first set of network elements to the second set of network elements comprises sending the initial configuration and operational status data to a testing platform for the testing platform to deploy the initial configuration and operational status data to the second set of network elements.

6. The medium of claim 5, wherein sequentially applying the set of recorded configuration state and status updates to the second set of network elements comprises sending each recorded configuration state and status update in the set of recorded configuration state and status updates to the testing platform for the testing platform to deploy the recorded configuration state and status update to the first set of network elements in order to reproduce the network failure on the second set of network elements.

7. The medium of claim 1, wherein the testing platform replays events leading to the network failure based on the configuration state and operational status data.

8. The medium of claim 1, wherein the operational status updates comprise routing table changes.

9. The medium of claim 1, wherein the operational status updates comprise link state changes.

10. The medium of claim 1, wherein the second set of network elements includes one or more virtual network elements executing within one or more virtual machines on a networked host device.

11. A method comprising:

receiving configuration state and operational status data associated with a first set of network elements, the configuration state and operational status data associated with a time period encompassing a network failure involving one or more network elements in the first set of network elements, the configuration and operational status data comprising initial configuration state and operational status data associated with the first set of network elements;

applying the initial configuration state and operational status data associated with the first set of network elements to a second set of network elements; and applying the received configuration state and operational status data to the second set of network elements to determine a cause of the network failure.

12. The method of claim 11 further comprising:

querying a network management system to request the configuration state and operational status data; and receiving, from the interface server, the configuration state and operational status data in response to the request.

13. The method of claim 12, wherein querying the network management system is performed in response to the network failure.

14. The method of claim 11, wherein the received configuration state and operational status data comprises a set of sequential updates to the first set of network elements between the initial configuration state of the first set of network elements and a state of the first set of network elements associated with the failure event.

15. The method of claim 11, wherein applying the initial configuration state and operational status data associated with the first set of network elements to the second set of network elements comprises sending the initial configuration and operational status data to a testing platform for the testing platform to deploy the initial configuration and operational status data to the second set of network elements.

16. The method of claim 15, wherein applying the set of recorded configuration state and status updates to the second set of network elements comprises sending each recorded configuration state and status update in the set of recorded configuration state and status updates to the testing platform for the testing platform to deploy the recorded configuration state and status update to the second set of network elements in order to reproduce the network failure on the second set of network elements.

17. The method of claim 11, wherein the testing platform replays events leading to the network failure based on the configuration state and operational status data.

18. The method of claim 11, wherein the operational status updates comprise routing table changes.

19. The method of claim 11, wherein the second set of network elements includes one or more virtual network elements executing within one or more virtual machines on a networked host device.

20. A system comprising:

one or more processors; and a non-transitory machine-readable medium storing instructions which, when executed by the one or more processors, cause the one or more processors to perform operations including:

receiving configuration state and operational status data associated with a first set of network elements, the configuration state and operational status data associated with a time period encompassing a network failure involving one or more network elements in the first set of network elements, the configuration and operational status data;

applying initial configuration state and operational status data associated with the first set of network elements to a second set of network elements; and applying the received set of recorded configuration state and operational status updates to the second set of network elements to determine a cause of the network failure.

* * * * *